United States Patent [19]

French et al.

[11] Patent Number: 5,172,205
[45] Date of Patent: Dec. 15, 1992

[54] PIEZORESISTIVE SEMICONDUCTOR DEVICE SUITABLE FOR USE IN A PRESSURE SENSOR

[75] Inventors: Patrick J. French; Toshiro Shinohara, both of Yokosuka, Japan

[73] Assignee: Nissan Motor Co., Ltd., Yokohama, Japan

[21] Appl. No.: 586,774

[22] Filed: Sep. 24, 1990

[51] Int. Cl.⁵ .................. H01L 29/84; H01L 29/96
[52] U.S. Cl. ........................ 257/414; 338/2; 338/42; 73/727; 73/777; 73/862.632; 257/417; 257/419; 257/622; 257/627
[58] Field of Search ............ 357/25, 26, 28, 60, 357/55; 338/2, 5, 42, 46; 73/862.65, 777, 727, 862.67

[56] References Cited

U.S. PATENT DOCUMENTS

| | | | |
|---|---|---|---|
| 4,236,137 | 11/1980 | Kurtz et al. | 338/5 |
| 4,506,283 | 3/1985 | Soclof | 357/60 |
| 4,706,100 | 11/1987 | Tufte | 357/26 |
| 4,737,473 | 4/1988 | Wilner | 357/26 |
| 4,739,381 | 4/1988 | Miura et al. | 357/26 |
| 4,793,194 | 12/1988 | Wilner | 338/2 |
| 4,874,500 | 10/1989 | Madou et al. | 357/25 |
| 4,878,957 | 11/1989 | Yamaguchi et al. | 357/60 |
| 4,961,833 | 10/1990 | Sakai et al. | 357/25 |
| 5,006,487 | 4/1991 | Stokes | 357/26 |

FOREIGN PATENT DOCUMENTS

| | | | |
|---|---|---|---|
| 3918769A1 | 12/1989 | Fed. Rep. of Germany | 357/26 |
| 61-42968 | 3/1986 | Japan | 357/26 |
| 62-124777 | 6/1987 | Japan | 357/26 |
| 63-40379 | 2/1988 | Japan | 357/26 |
| 63-292051 | 11/1988 | Japan | 357/25 |
| 2-34973 | 2/1990 | Japan | 357/26 |

OTHER PUBLICATIONS

Allan, Roger, "New Applications Open Up For Silicon Sensors: A Special Report," Electronics, Nov. 6, 1980, pp. 113–122.

*Primary Examiner*—Rolf Hille
*Assistant Examiner*—Minhloan Tran
*Attorney, Agent, or Firm*—Foley & Lardner

[57] ABSTRACT

A piezoresistive device, in which separation grooves having a cross section defined by four (111) planes and including side walls of a silicon oxide film are formed in a surface area of a semiconductor substrate having a surface of (100) plane, and at least one piezoresistor having an inversed triangular cross section defined by one (100) plane and two (111) planes is formed in the surface area of the semiconductor substrate and is surrounded by the separation grooves for separating the piezoresistor from the semiconductor substrate.

6 Claims, 4 Drawing Sheets

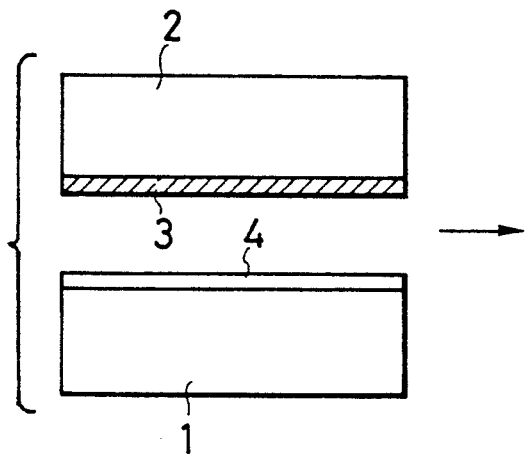
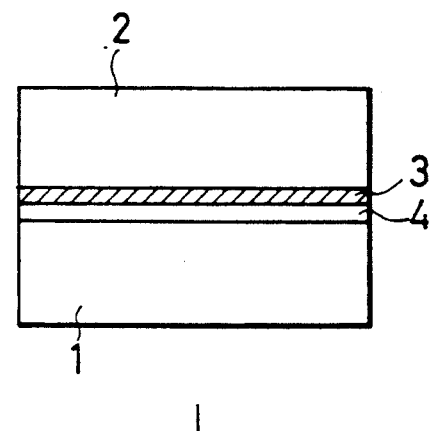
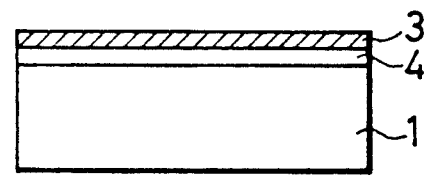
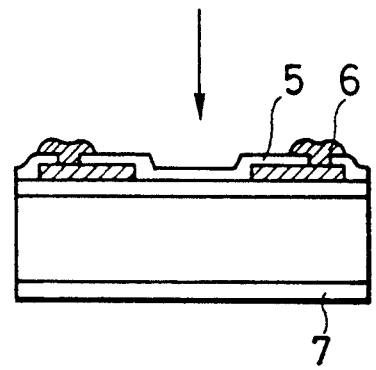
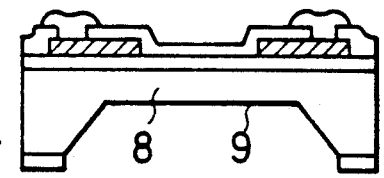

PIEZORESISTIVE SEMICONDUCTOR DEVICE SUITABLE FOR USE IN A PRESSURE SENSOR

BACKGROUND OF THE INVENTION

1. Field of the Invention

The present invention relates to a piezoresistive device formed on a semiconductor substrate for use in an accelerometer, a pressure sensor or the like.

2. Description of the Background Art

Recently, there have been developed micro-miniature piezoresistive devices for use in detecting acceleration by sensing a minute stress variation or resistance variation due to piezoresistance effect of a semiconductor film formed on a semiconductor substrate.

Such piezoresistive devices are formed using a thin film technology, and hence they have the excellent features that they can be formed extremely small in size, for instance, with a length of approximately 100 μm of a vibrating portion, a thickness of approximately 1 μm, and an overall chip size of approximately 1 mm square, and in addition, that they can be formed on the same substrate along with other devices in an integrated circuit.

In one piezoresistive device, for example, a thin film resistor pattern of a p+-type diffusion layer is formed on a surface of an n-type silicon semiconductor substrate. In this piezoresistive device, a leakage current is generated through a PN junction at a high temperature of more than 150° C.

In order to overcome this problem, two solutions have been proposed.

In one solution, a polysilicon film is used as a pressure-sensitive resistor which is separated from a substrate by a silicon oxide film. In this case, no leakage current is generated between the resistor and the substrate even at the high temperature. However, in this structure, sensitivity is lowered. In order to improve this problem, a laser recrystalization technique has been used to produce large grains. However, in this case, gauge factors remain below 45.

In another solution, the SOI (silicon on insulator) technique is used. A method for producing a piezoresistive device using the SOI technique is shown in FIGS. 1a to 1e.

In FIG. 1a, a p+-type diffusion layer 3 is formed on the surface of a second silicon semiconductor substrate 2, and a silicon oxide film 4 is formed in the surface area of a first silicon semiconductor substrate 1 separated from the second silicon semiconductor substrate 2.

In FIG. 1b, the second and first silicon semiconductor substrates 2 and 1 are electrostatically bonded so that the p+-type diffusion layer 3 and the silicon oxide film 4 are directly contacted with each other.

In FIG. 1c, the second silicon semiconductor substrate 2 is removed by etching to expose the p+-type diffusion layer 3.

In FIG. 1d, the p+-type diffusion layer 3 is patterned to form piezoresistors on the silicon oxide film 4, and then the top of the resulting material is covered by silicon oxide film 5. A patterning of the silicon oxide film 5 is carried out to form electrodes 6 on the piezoresistors.

In FIG. 1e, a silicon oxide film 7 is formed on the back surface of the first silicon semiconductor substrate 1, and a back surface area 8 of the first silicon semiconductor substrate 1 is etched to form a diaphragm 9.

In this method, good electrical characteristics even at a high temperature of approximately 250° C. and a high gauge factor are obtained. However, this method uses two silicon semiconductor substrates one of which is to be entirely removed by etching, and requires a complicated fabrication processing to invite a high cost.

SUMMARY OF THE INVENTION

Accordingly, it is an object of the present invention to provide a piezoresistive device in view of the above-described disadvantages and defects of the prior art, which is capable of operating with high sensitivity and high gauge factor even at a high temperature without requiring a second substrate and a complicated and costly fabrication processing.

In accordance with one aspect of the present invention, there is provided a piezoresistive device, comprising a semiconductor substrate having a surface of (100) plane, separation groove means formed in a surface area of the semiconductor substrate, the separating groove means having a cross section defined by four (111) planes and including side walls of a silicon oxide film, and piezoresistor means formed in the surface area of the semiconductor substrate and surrounded by the separation groove means for separating the piezoresistor means from the semiconductor substrate, the piezoresistor means having an inversed triangular cross section defined by one (100) plane and two (111) planes.

BRIEF DESCRIPTION OF THE DRAWINGS

FIGS. 1a to 1e are cross sections showing a conventional method for producing a piezoresistive device;

DESCRIPTION OF THE PREFERRED EMBODIMENTS

Figure 2:
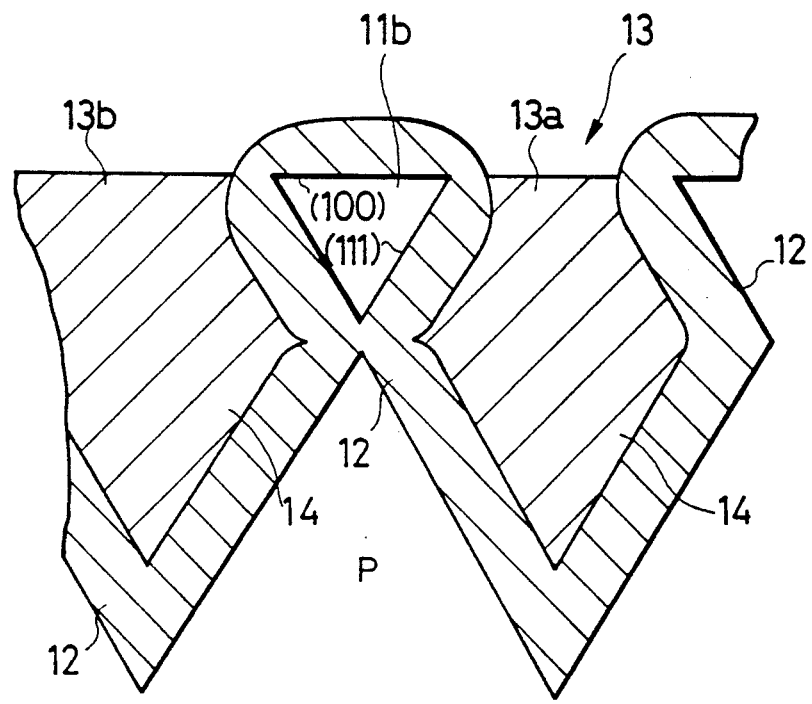
FIGS. 2a and 2b illustrate one embodiment of a piezoresistive device according to the present invention, FIG. 2a being cross section, taken along the line 2a—2a in FIG. 2b.
Figure 2:
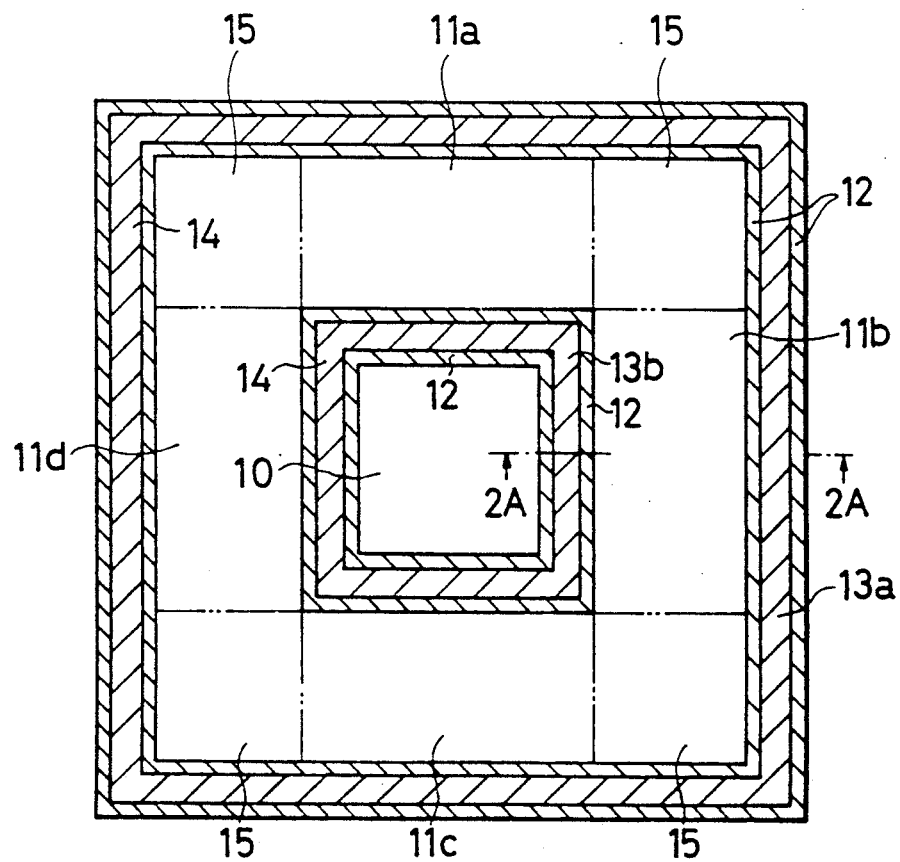

Referring now to the drawings, wherein like reference characters designate like or corresponding parts throughout the several views and thus the repeated description thereof may be omitted for the brevity, there is shown in FIGS. 2a and 2b the first embodiment of a piezoresistive device according to the present invention.

As shown in FIGS. 2a and 2b, concentric large and small square annular separating grooves 13a and 13b each having a cross section defined by four slant (111) planes are formed in the surface area of a single crystal p-type silicon semiconductor substrate 10 having the surface of (100) plane, and the two separating grooves 13a and 13b are surrounded by side walls composed of a silicon oxide film 12. The two separating grooves are filled with polysilicon 14. A square annular p-type silicon island region having an inversed triangular cross section defined by one flat (100) plane and two slant (111) planes is formed between the two separating grooves 13a and 13b via the silicon oxide films 12 for completely enclosing the island region and separating the island region from the substrate 10. In the island region between the small and large separating grooves 13b and 13a, four piezoresistor sensor regions 11a, 11b, 11c and 11d are arranged along the four side walls of the small square annular separating groove 13b, and four p+-type diffusion regions 15 for connecting the piezoresistor regions 11a, 11b, 11c and 11d are formed in the four corner portions.

The present invention can be used as a single resistor or in the form of a bridge, as shown in FIG. 2b. In both cases the ends of the resistor or resistors are contacted via the p+-type diffusion regions 15. The entire bridge of the resistors is contained within a single island region of a square ring form. All resistors are separated by the polysilicon filled in the separating grooves via the silicon oxide films and are aligned precisely in parallel or perpendicular to the (110) direction.

A method for producing the piezoresistive device shown in FIGS. 2a and 2b will now be described in detail with reference to FIGS. 3a to 3d.

Figure 3A:
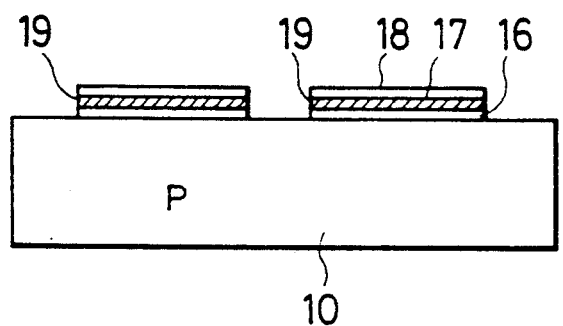
FIGS. 3a to 3d are cross sections showing a method for producing the piezoresistive device shown in FIGS. 2a and 2b.

In FIG. 3a, a silicon oxide film 16, a silicon nitride film 17 and a silicon oxide film 18 are consecutively deposited on a p-type silicon semiconductor substrate 10 having a top surface of the (100) plane to form a three-layer film thereon. Then, the three-layer film is selectively etched by using a photolithographic method to open windows 19 in the three-layer film.

Figure 3B:
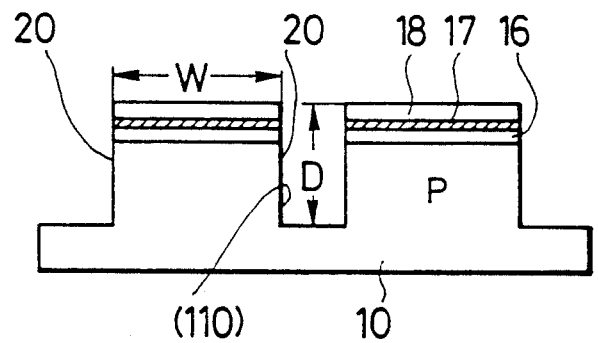

In FIG. 3b, by using the three-layer film as a mask, the surface area of the substrate 10 is etched to a predetermined depth by a reactive ion etching (RIE) using chlorine gas to form trenches 20 having side walls of (110) plane.

Figure 3C:
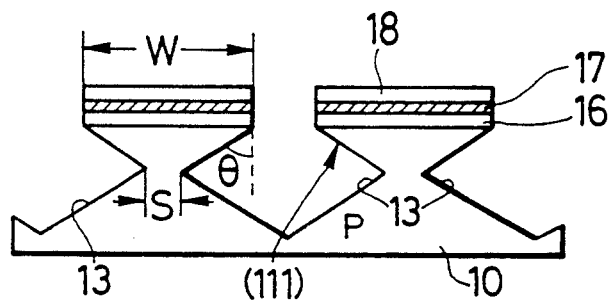

In FIG. 3c, an anisotropic etching of the resulted substrate 10 is carried out with the three-layer film as a mask by using an etching solution including potassium hydroxide (KOH) to form separating grooves 13 defined by side walls of the (111) plane.

The principle of the anisotropic etching of the trenches 20 having the side walls of the (110) plane will now be described in detail.

As shown in FIGS. 3b and 3c, the silicon semiconductor substrate 10 has the upper surface of the (100) plane extending in the horizontal direction and the trenches 20 have the side walls of the (110) plane extending in the vertical direction. Then, the anisotropic etching of the substrate 10 is to be carried out.

When the anisotropic etching of the substrate is carried out by using the etching solution including KOH, the ratio of the etching rate of the (110):(100):(111) planes are approximately 600:300:1. Therefore, the side surfaces of the trenches can be rapidly etched. The bottoms of the trenches are etched at a not so fast speed but can be etched until the four (111) planes are exposed. When the four (111) planes are exposed, the etching is almost stopped or the etching speed becomes quite slow.

Now, assuming that a surface width of a silicon island or an interval between two trenches is W, that a depth of the trenches is D, that a width of a narrow portion of the silicon island when the etching is stopped is S, and that an angle between the (110) and (111) planes is $\theta$ ($\theta = 35.26°$), the following formula is satisfied:

$$W = S + D \cdot \tan \theta \qquad (1)$$

Accordingly, one the values W, D and S can be readily determined. Hence, an accurate processing of the trenches formed in the substrate can be readily and easily carried out by using the (111) plane as an etching stopper to obtain good controllability of the processing.

Figure 3D:
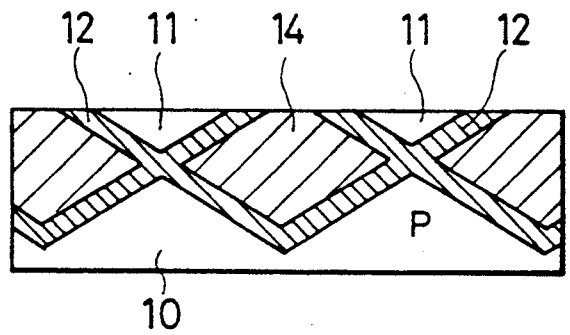

In FIG. 3d, the walls of the separating grooves 13 are oxidized, while the narrow portions of the silicon islands regions 11 are also oxidized, to form silicon oxide films 12 surrounding the inversed triangular island regions 11 in cross section for separating the silicon island regions 11 as piezoresistor regions from the substrate. That is, the inversed triangular island region 11 is formed between the separating grooves 13. Then, the separating grooves 13 are filled with polysilicon 14 by the CVD method. Windows are opened in the corner portions of the three-layer film portions formed on the surface of the substrate by the photolithographic method, and an impurity such as boron ion is diffused into the corner portions of the island regions 11 to form p+-type diffusion regions 15 in the four corner portions so as to ensure good contacts of the inversed triangular piezoresistor regions 11a, 11b, 11c and 11d. Then, the three-layer film portions are removed.

Then, the surface is covered by the silicon oxide film, and a wiring pattern is formed on the surface of the resulted material in a conventional manner to obtain a piezoresistive device according to the present invention.

In the above-described piezoresistive device according to the present invention, the inversed triangular piezoresistor regions 11 (11a, 11b, 11c and 11d) are each surrounded by one flat (100) plane and two slant (111) planes. Therefore, when piezoresistor regions or island regions are formed, the etching can be carried out with good controllability and high accuracy. Hence, in the piezoresistive device of the present invention, only by properly selecting the etching directions, the etching with good controllability can be effected, and accuracy in forming the shapes such as separating grooves and inverted triangular island regions can be performed. Further, since the triangular piezoresistor region has a larger mechanical strength, its size can be reduced rather than a rectangular piezoresistor region, and the sensitivity can be improved.

In the piezoresistive device of the present invention, since the surface is covered by the silicon oxide film and no PN junction is used, no leakage current is generated between the piezoresistor regions and the substrate. In this case, the piezoresistive device can be operated without causing deterioration even at a temperature of approximately 250° C., as compared with a conventional device including a PN junction between the resistor portions and the substrate being safely operable at a temperature of approximately at most 150° C.

In the piezoresistive device according to the present invention, the sensitivity or the gauge factor is largely improved to approximately 120 as compared with 40 of the conventional device using the polysilicon.

Figure 4A:
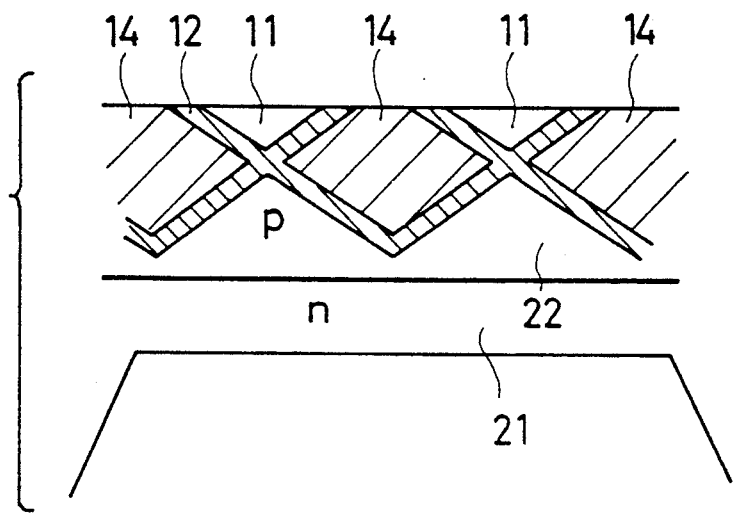
FIGS. 4a and 4b illustrate other embodiments of a piezoresistive device according to the present invention.
Figure 4B:
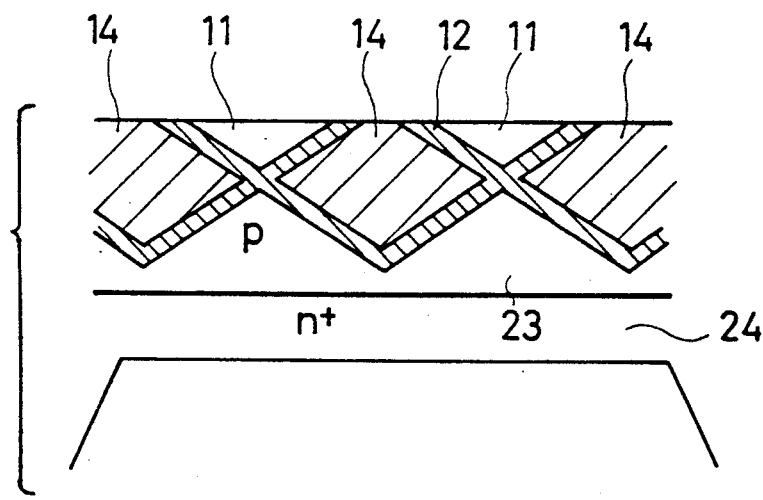

In FIGS. 4a and 4b, there are shown other embodiments of the piezoresistive device according to the present invention. In FIG. 4a, the piezoresistive device is formed in a p-type diffusion region 22 formed in an n-type silicon semiconductor substrate 21, and in FIG. 4b, the piezoresistive device is formed in a p-type epitaxial layer 23 grown on an n+-type buried layer 24. An electrochemical etching is used to form a diaphragm for a piezoresistive device such as a pressure sensor, and the PN junction can be used as an etching stopper in the electrochemical etching. Hence, a thickness of the diaphragm can be readily controlled.

Now, when a KOH etchant is held at 70° C. in the etching, a positive voltage is applied to the n-type layer, the etching of the n-type silicon layer 21 or the n+-type buried layer 24 is stopped, thereby readily controlling the thickness of the diaphragm.

What is claimed is:

1. A piezoresistive semiconductor device, comprising:
   (a) a silicon semiconductor substrate (10) having a surface of a plane flush with (100)-crystal plane;
   (b) inner and outer square ring shaped separation grooves (13a, 13b) formed in a surface area of the silicon semiconductor substrate, one side of each of said inner and outer square ring shaped separation grooves having a cross-section defined by four (111)-crystal planes and side walls covered with a silicon film (12); and
   (c) a piezoresistive area (11) formed in the surface area of the semiconductor substrate and surrounded by said inner and outer square ring shaped separation grooves, said piezoresistive area being inversed triangular in cross section defined by one (100)-crystal plane and two (111)-crystal planes.

2. The piezoresistive semiconductor device of claim 1, wherein each side of said inner and outer square ring shaped separation grooves extends in a direction parallel or perpendicular to a (110)-crystal plane of a p-type silicon semiconductor substrate (10).

3. The piezoresistive semiconductor device of claim 1, wherein said inner and outer square ring shaped separation grooves are filled with polysilicon.

4. The piezoresistive semiconductor device of claim 3, wherein two sides of each of said separation grooves are connected with one another by a p+-type diffusion region (15).

5. The piezoresistive semiconductor device of claim 1, wherein said piezoresistive area surrounded by said inner and outer square ring shaped separation grooves is formed in a p-type diffusion region (22) formed in the n-type silicon semiconductor substrate (21).

6. The piezoresistive semiconductor device of claim 1, wherein said piezoresistive area surrounded by said inner and outer square ring shaped separation grooves is formed in a p-type epitaxial growth layer (23) grown on an n-type buried layer (24).

* * * * *